US010982030B2

(12) United States Patent
Dong et al.

(10) Patent No.: US 10,982,030 B2
(45) Date of Patent: Apr. 20, 2021

(54) AQUEOUS POLYMER COMPOSITION

(71) Applicants: Dow Global Technologies LLC, Midland, MI (US); Rohm and Haas Company, Collegeville, PA (US)

(72) Inventors: Xiangting Dong, Shanghai (CN); Han Liu, Shanghai (CN); Junyu Chen, Shanghai (CN); Qingwei Zhang, Shanghai (CN); Ling Li, Blue Bell, PA (US); Alvin M. Maurice, Lansdale, PA (US); Jintao Liu, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/347,381

(22) PCT Filed: Dec. 22, 2016

(86) PCT No.: PCT/CN2016/111433
§ 371 (c)(1),
(2) Date: May 3, 2019

(87) PCT Pub. No.: WO2018/112819
PCT Pub. Date: Jun. 28, 2018

(65) Prior Publication Data
US 2020/0262954 A1    Aug. 20, 2020

(51) Int. Cl.
*C08F 2/22*        (2006.01)
*C08F 220/06*    (2006.01)
*C08F 228/02*    (2006.01)
*C08F 230/02*    (2006.01)
*C09D 133/08*    (2006.01)
*C08K 5/17*        (2006.01)
*C08F 220/12*    (2006.01)

(52) U.S. Cl.
CPC .......... *C08F 220/12* (2013.01); *C09D 133/08* (2013.01)

(58) Field of Classification Search
CPC ..................................... C08F 2/22; C08F 6/02
See application file for complete search history.

(56) References Cited

U.S. PATENT DOCUMENTS

| 5,349,026 | A | 9/1994 | Emmons et al. |
| 6,005,042 | A | 12/1999 | Desor et al. |
| 6,297,328 | B1 * | 10/2001 | Collins ................. C08F 220/28 525/328.6 |
| 6,512,042 | B1 * | 1/2003 | Fischer ..................... C08F 8/30 524/558 |
| 6,756,459 | B2 * | 6/2004 | Larson .................. C08F 257/02 524/547 |
| 8,609,762 | B2 | 12/2013 | Killilea et al. |
| 2007/0191521 | A1 | 8/2007 | Zhao |

FOREIGN PATENT DOCUMENTS

| CN | 104011087 A | 8/2014 |
| EP | 697417 B1 | 5/1999 |
| EP | 1447432 A1 | 8/2004 |
| EP | 2341094 A2 | 7/2011 |
| EP | 2495281 A1 | 9/2012 |
| EP | 2009072 B1 | 8/2016 |
| JP | 2005089518 A | 4/2005 |
| WO | 2003059971 A1 | 7/2003 |
| WO | 2014092914 A1 | 6/2014 |
| WO | WO-2015161503 A1 * | 10/2015 ............ C09J 133/26 |

OTHER PUBLICATIONS

International Search Report; International Application No. PCT/CN2016/111433; International Filing Date:Dec. 22, 2016; dated Sep. 20, 2017; 3 pages.
Written Opinion; International Application No. PCT/CN2016/111433; International Filing Date:Dec. 22, 2016; dated Sep. 20, 2017; 4 pages.

* cited by examiner

*Primary Examiner* — Vu A Nguyen
(74) *Attorney, Agent, or Firm* — Karl E. Stauss; Cantor Colburn LLP

(57) ABSTRACT

A method of producing an aqueous polymer composition and a method of reducing yellowing of an aqueous polymer composition and a coating made therefrom.

11 Claims, No Drawings

AQUEOUS POLYMER COMPOSITION

FIELD OF THE INVENTION

The present invention relates to an aqueous polymer composition and a method of making the same.

INTRODUCTION

Aqueous dispersions also known as water borne dispersions of polymers are becoming increasingly more important than solvent-based polymer dispersions for less environmental problems. Aqueous dispersions of acetoacetyl group-containing acrylic polymers are commonly used as binders in coating applications. To prohibit hydrolysis of the acetoacetyl group, ammonia or an organic amine is typically added to neutralize the acrylic polymers to a pH of about 8.0-10.0. Coatings comprising such acetoacetyl group-containing acrylic polymer have desired properties, such as high gloss, block resistance, durability, and adhesion. However, these types of binders tend to show discoloration (e.g., yellowness) over time either in the wet or dry state, when exposed to sunlight, particularly upon aging of the coatings.

Attempts have been made to reduce yellowing of coatings. U.S. Pat. No. 7,417,086 discloses a method of producing aqueous polymer compositions that provide coatings with less yellowness. The method comprises (a) providing at least one aqueous polymer that has a glass transition temperature from −80° C. to 110° C., wherein said aqueous polymer is made by aqueous emulsion polymerization of a monomer mixture that excludes all dienes and that comprises 1% to 99% acrylate monomers, by weight based on the total weight of all monomers, (b) adding to said aqueous polymer at least 10 ppm of at least one coordinating agent, by weight based on the dry weight of said at least one polymer, and (c) raising the pH of said aqueous polymer from 7 or less to above 7, wherein said aqueous composition contains 0 to 100 ppm ammonia compound, by weight based on the dry weight of said at least one polymer.

There remains a need to provide an aqueous polymer composition that is storage stable and provides films made therefrom with reduced yellowing.

SUMMARY OF THE INVENTION

The present invention provides a method of producing a stable aqueous polymer composition comprising an acetoacetyl group-containing emulsion polymer, and a coating composition comprising the aqueous polymer composition. The aqueous polymer composition is storage stable, which shows a hydrolysis ratio of acetoacetyl groups less than 12% after heatage at 50° C. for 2 weeks. The aqueous polymer composition also can provide dry films made therefrom with less yellowing, as indicated by Δb value less than 1.0 after heat aging at 50° C. for 2 weeks. Storage stability and yellowing properties are measured according to the test methods described in the Examples section below.

In a first aspect, the present invention is a method of making an aqueous polymer composition. The method comprises, (i) emulsion polymerization of a monomer composition, optionally in the presence of ammonia, a primary amine, or mixtures thereof, to give an emulsion polymer;

wherein the monomer composition comprises, based on the total weight of the monomer composition, (a) from 1% to 15% by weight of an acetoacetyl functional monomer;

(b) from 0.3% to 10% by weight of an ethylenically unsaturated monomer carrying at least one functional group selected from a sulfonate, phosphate, hydroxyl, amide, or ureido group; and (c) from 0 to 1% by weight of an ethylenically unsaturated acid monomer;

provided that the total amount of (b) and (c) is at least 1.3% by weight; and (ii) optionally adding ammonia, a primary amine, or mixtures thereof to the emulsion polymer; thus to form the aqueous polymer composition having a pH value in the range of 6-10;

wherein the equivalent ratio of total ammonia, primary amines, or mixtures thereof added in (i) and (ii) to the acetoacetyl functional monomer is in the range of from 0.125 to 0.8.

In a second aspect, the present invention is an aqueous polymer composition obtained by the method of the first aspect.

In a third aspect, the present invention is a method for reducing yellowing of an aqueous polymer composition. The method comprises:

(i) emulsion polymerization of a monomer composition, optionally in the presence of ammonia, a primary amine, or mixtures thereof, to give an emulsion polymer;

wherein the monomer composition comprises, based on the total weight of the monomer composition, (a) from 1% to 15% by weight of an acetoacetyl functional monomer;

(b) from 0.3% to 10% by weight of an ethylenically unsaturated monomer carrying at least one functional group selected from a sulfonate, phosphate, hydroxyl, amide, or ureido group; and (c) from 0 to 1% by weight of an ethylenically unsaturated acid monomer;

provided that the total amount of (b) and (c) is at least 1.3% by weight; and (ii) optionally adding ammonia, a primary amine, or mixtures thereof to the emulsion polymer; thus to form the aqueous polymer composition having a pH value in the range of 6-10;

wherein the equivalent ratio of total ammonia, primary amines, or mixtures thereof added in (i) and (ii) to the acetoacetyl functional monomer is in the range of from 0.125 to 0.8.

In a fourth aspect, the present invention is a coating composition comprising the aqueous polymer composition of the second aspect.

DETAILED DESCRIPTION OF THE INVENTION

"Acrylic" in the present invention include (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein, can be measured by various techniques including, for example, differential scanning calorimetry ("DSC") or calculation by using a Linear equation. For example, $T_g$ of an emulsion copolymer comprising polymerized units of Monomers a, b, and c, is determined according to the following linear equation:

$$T_g = W_a * T_{ga} + W_b * T_{gb} + W_c * T_{gc}$$

wherein $T_{ga}$, $T_{gb}$, and $T_{gc}$ refer to the linear $T_g$ of homopolymer of Monomer a, homopolymer of Monomer b, and homopolymer of Monomer c, respectively; and $W_a$, $W_b$, and $W_c$ refer to the weight fraction of Monomer a, Monomer b, and Monomer c used for preparing the emulsion polymer, based on the weight of total monomers, respectively.

"Polymerized unit", also known as "structural unit", of the named monomer, refers to the remnant of the monomer after polymerization.

The method of making an aqueous polymer composition of the present invention comprises emulsion polymerization of a monomer composition to form an emulsion polymer. The monomer composition useful in the present invention comprises (a) one or more acetoacetyl functional monomers. The acetoacetyl functional monomers may include one or more of the following acetoacetyl functional groups represented by:

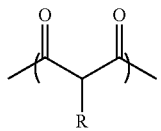

wherein R is hydrogen, or alkyl having 1 to 10 carbon atoms, or phenyl.

Examples of acetoacetoxy functional groups are

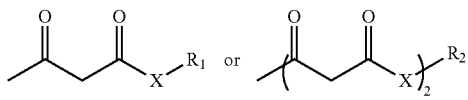

wherein X is O, $R_1$ is a divalent radical and $R_2$ is a trivalent radical, that attach the acetoacetoxy functional group to the polymer backbone.

The acetoacetyl functional monomer useful in the present invention may be an ethylenically unsaturated acetoacetyl functional monomer. Particularly preferred ethylenically unsaturated acetoacetyl functional monomers include, acetoacetoxyethyl methacrylate ("AAEM"), acetoacetoxyethyl acrylate, acetoacetoxypropyl (meth)acrylate, allyl acetoacetate, vinyl acetoacetate, acetoacetoxybutyl (meth)acrylate, 2,3-di(acetoacetoxy)propyl (meth)acrylate, t-butyl acetoacetate, or combinations thereof. The monomer composition useful in the present invention may comprise, based on the total weight of the monomer composition, 1% by weight or more, 3% by weight or more, or even 4% by weight or more, and at the same time, 15% by weight or less, 12% by weight or less, or even 8% by weight or less, of the acetoacetyl functional monomers.

The monomer composition useful in the present invention may also comprise (b) one or more ethylenically unsaturated monomers carrying at least one functional group selected from a sulfonate, phosphate, hydroxyl, amide, or ureido group. Sulfonate and phosphate groups herein in the ethylenically unsaturated monomers carrying at least one functional group are in the salt form. Suitable ethylenically unsaturated monomers carrying at least one functional group may include α,β-unsaturated amides, hydroxy-functional (meth)acrylic acid alkyl esters, sodium styrene sulfonate (SSS), sodium vinyl sulfonate (SVS), and mixtures thereof. The α,β-unsaturated amides useful in the present invention may include, for example, acrylamide, methacrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide and diacetoneacrylamide. The hydroxy-functional (meth)acrylic acid alkyl ester useful in the present invention may have the structure of formula (I):

wherein $R^1$ is hydrogen or methyl, and $R^2$ is a hydroxyalkyl group having from 2 to 6 carbon atoms. Examples of suitable hydroxy-functional (meth)acrylic acid alkyl esters include 2-hydroxyethyl acrylate; 2-hydroxyethyl methacrylate; and 2-hydroxyethyl methacrylate; hydroxypropyl (meth)acrylate including, for example, 2-hydroxypropylacrylate, 2-hydroxypropyl methacrylate, 3-hydroxypropyl acrylate, and 3-hydroxypropyl methacrylate; hydroxybutyl (meth)acrylates including, for example, 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; or mixtures thereof. The ureido-functional monomer herein refers to an ethylenically unsaturated monomer comprising a cyclic ureido group (i.e., an imidazolidin-2-one group). Preferred ureido-functional monomer is a ureido-functional (meth)acrylic acid alkyl ester. Examples of suitable ureido-functional monomer include:

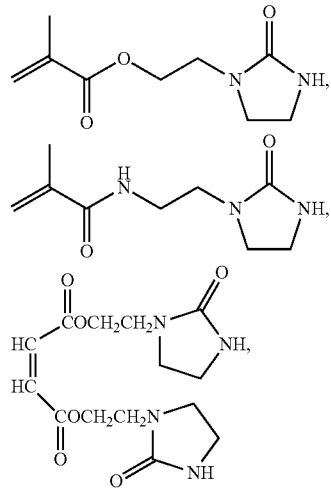

and mixtures thereof. The monomer composition useful in the present invention may comprise, based on the total weight of the monomer composition, 0.3% by weight or more, 0.4% by weight or more, 0.5% by weight or more, 0.6% by weight or more, 0.8% by weight or more, or even 1% by weight or more, and the same time, 10% by weight or less, 9% by weight or less, 8% by weight or less, 7% by weight or less, 5% by weight or less, or even 3% by weight or less, of the ethylenically unsaturated monomer carrying at least one functional group.

The monomer composition useful in the present invention may further comprise (c) one or more ethylenically unsaturated acid monomers. The ethylenically unsaturated acid monomers herein are in the protonated form. The ethylenically unsaturated acid monomers may be selected from an α,β-ethylenically unsaturated carboxylic acid, a phosphorous-containing acid monomer, a sulfonic acid monomer, and mixtures thereof. Examples of suitable α,β-ethylenically unsaturated carboxylic acids include an acid-bearing monomer such as (meth)acrylic acid, itaconic acid, or fumaric acid; or a monomer bearing an acid-forming group which yields or is subsequently convertible to, such an acid group (such as anhydride, (meth)acrylic anhydride, or maleic anhydride); or mixtures thereof. Examples of suitable phosphorous-containing acid monomers include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_1O)_n-P(O)(OH)_2$, wherein $R=H$ or $CH_3$ and $R_1$=alkyl, such as SIPOMER™ PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are dihydrogen phosphate monomers, which include 2-phosphoethyl (meth)acrylate, 2-phosphopropyl (meth)acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof. Preferred sulfonic containing acid monomer is 2-acrylamido-2-methylpropanesulfonic acid (AMPS). The monomer composition useful in the present invention may comprise, based on the total weight of the monomer composition, from 0 to 1% by weight of the ethylenically unsaturated acid monomer, for example, 0.6% by weight or less, 0.5% by weight or less, 0.3% by weight or less, 0.2% by weight or less, or even 0.1% by weight or less, of the ethylenically unsaturated acid monomer. In one embodiment, the monomer composition contains less than 0.3% by weight, or even substantially free of, the ethylenically unsaturated acid monomer. "Substantially free of the ethylenically unsaturated acid monomer" means that the concentration of the ethylenically unsaturated acid monomer is zero in one preferred embodiment and can be less than 0.01% by weight in another embodiment, less than 0.05% in still another embodiment or even less than 0.1% by weight in yet another embodiment, based on the total weight of the monomer composition.

The total amount of the ethylenically unsaturated monomer carrying at least one functional group (b) and the ethylenically unsaturated acid monomer (c) may be at least 1.3% by weight, at least 1.5% by weight, or at least 1.7% by weight, based on the total weight of the monomer composition. In the case where the monomer composition comprises the ethylenically unsaturated acid monomer, the weight ratio of ethylenically unsaturated monomer carrying at least one functional group to ethylenically unsaturated acid monomer may be more than 0.5, for example, at least 0.55, at least 0.6, at least 1.0, at least 1.5, or at least 2.

In addition to the monomers described above, the monomer composition useful in the present invention may also comprise one or more additional ethylenically unsaturated monomers that exclude monomers (a), (b), and (c) described above. The additional ethylenically unsaturated monomers, preferably monoethylenically unsaturated monomer, can be alkyl esters of (meth)acrylic acid, vinyl aromatic monomers, vinyl esters of carboxylic acid, ethylenically unsaturated nitriles, or mixtures thereof. The alkyl esters of (meth)acrylic acid may be $C_1$-$C_{18}$, preferably $C_1$-$C_{12}$, alkyl esters of (meth)acrylic acid. Examples of suitable alkyl esters of (meth)acrylic acid include methyl (meth)acrylate, ethyl (meth)acrylate, propyl (meth)acrylate, butyl (meth)acrylate, 2-ethylhexyl (meth)acrylate, iso-butyl (meth)acrylate, hexyl (meth)acrylate, lauryl (meth)acrylate, stearyl (meth)acrylate, cyclohexyl (meth)acrylate, benzyl(meth)acrylate, oleyl (meth)acrylate, palmityl (meth)acrylate, nonyl(meth)acrylate, decyl(meth)acrylate, dodecyl (meth)acrylate, pentadecyl (meth) acrylate, hexadecyl (meth)acrylate, octadecyl (meth)acrylate, and the like; vinyl acetate, (meth)acrylonitrile, or mixtures thereof. Preferred alkyl esters of (meth)acrylic acids include methyl (meth)acrylate, ethyl (meth)acrylate, butyl (meth)acrylate, 2-ethylhexyl acrylate, or mixtures thereof. Examples of suitable vinyl aromatic monomers include styrene and substituted styrene such as .alpha.-methyl styrene, p-methyl styrene, t-butyl styrene, vinyltoluene, or mixtures thereof. Preferred vinyl aromatic monomer is styrene. The monomer composition may comprise, based on the total weight of the monomer composition, 70% by weight or more, 74% by weight or more, or even 80% by weight or more, and at the same time, 99% by weight or less, 93% by weight or less, or even 85% by weight or less, of the additional ethylenically unsaturated monomers. In one embodiment, the monomer composition comprises, the acetoacetyl functional monomer, the ethylenically unsaturated monomers carrying at least one functional group, and optionally the ethylenically unsaturated acid monomers, the rest being the additional ethylenically unsaturated monomers.

In one embodiment, the monomer composition useful in the present invention comprises, based on the total weight of the monomer composition, from 1% to 8% by weight of the acetoacetyl functional monomer such as AAEM;

from 0.3% to 5% by weight of the ethylenically unsaturated monomers carrying at least one functional group, such as acrylamide, sodium styrene sulfonate, 2-hydroxyethyl methacrylate, sodium vinyl sulfonate, methacrylamide, or mixtures thereof;

from 0 to 0.8% and preferably less than 0.6% of the ethylenically unsaturated acid monomer such as acrylic acid, methacrylic acid, the phosphorous-containing acid monomer, or mixtures thereof; and from 74% to 99% by weight of the additional ethylenically unsaturated monomers such as methyl methacrylate, butyl acrylate, styrene, 2-ethylhexyl acrylate, ethyl acrylate, butyl methacrylate, or mixtures thereof.

Total weight concentration of the monomers described above that constitute polymerized units of the emulsion polymer may be equal to 100%. The types and levels of the monomers described above may be chosen to provide the obtained emulsion polymer with a glass transition temperature ($T_g$) suitable for different applications. The emulsion polymer may have a $T_g$ of −10° C. or more, 0° C. or more, 15° C. or more, or even 30° C. or more, and at the same time, 60° C. or less, 50° C. or less, or even 45° C. or less.

The emulsion polymer useful in the present invention comprises particles having a weight average particle size of from 10 to 500 nanometers (nm), from 50 to 400 nm, or from 80 to 300 nm. The particle size herein may be measured by a Brookhaven BI-90 Plus Particle Size Analyzer.

The emulsion polymer useful in the present invention may be prepared by emulsion polymerization of the monomer composition described above. Total weight concentration of monomers for preparing the emulsion polymer is equal to 100%. The monomer composition may be added neat or as an emulsion in water; or added in one or more additions or continuously, linearly or nonlinearly, over the reaction period of preparing the emulsion polymer. Temperature suitable for emulsion polymerization processes may be lower than 100° C., in the range of from 30 to 95° C., or in the range of from 50 to 90° C. Multistage free-radical polymerization using the monomers described above can be used, which at least two stages are formed sequentially, and usually results in the formation of the multistage polymer comprising at least two polymer compositions.

In the polymerization process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the emulsion polymer, a surfactant may be used. The surfactant may be added prior to or during the polymerization of the monomers, or combinations thereof. A portion of the surfactant can also be added after the polymerization. These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. In some preferred embodiments, the alkali metal or ammonium salts of alkyl, aryl, or alkylaryl sulfates surfactant are used. The surfactant used is usually from 0.1% to 10% by weight, preferably from 0.2% to 3% by weight, based on the weight of total monomers used for preparing the emulsion polymer.

In the polymerization process of preparing the emulsion polymer, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer. The chain transfer agent may be used in an amount from 0 to 3% by weight, from 0.01% to 1% by weight, or from 0.05% to 0.5% by weight, based on the total weight of monomers used for preparing the emulsion polymer.

The method of making the aqueous polymer composition of the present invention further comprises addition of ammonia, a primary amine, or mixtures thereof. In one embodiment, emulsion polymerization of the monomer composition is conducted in the presence of ammonia, a primary amine, or mixtures thereof. Ammonia and/or primary amine can be added during polymerization of the emulsion polymer, e.g., added in one or more additions or continuously, linearly or nonlinearly, over the reaction period of preparing the emulsion polymer; and/or added after completing polymerization of the monomer composition. In another embodiment, ammonia and/or the primary amine are added after emulsion polymerization, that is, ammonia and/or the primary amine are mixed with the emulsion polymer, to form the aqueous polymer composition. The equivalent ratio of total ammonia and/or primary amines to the acetoacetyl functional monomer may be 0.125 or higher, 0.2 or higher, or even 0.3 or higher, and at the same time, 0.8 or lower, 0.6 or lower, or even 0.5 or lower. "Equivalent ratio" herein refers to the molar ratio of total ammonia and/or primary amine groups to acetoacetyl groups. The aqueous polymer composition may have a pH value of from 6.0 to 10.0 or from 7.0 to 9.5, or from 7.5 to 8.5. In one embodiment, ammonia is added. In another embodiment, one or more primary amines or their mixtures with ammonia are used. Examples of suitable primary amines include such as mono ethanol amine, 2-Amino-2-methyl-1-propanol, ethylamine, methyl amine, isopropyl amine, diglycol amine, propylamine, monobutylamine, hexylamine, diethyl amine, dimethyl amine, tributylamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; or mixtures thereof. Preferred primary amines are selected from the group consisting of mono ethanol amine, isopropyl amine, and diglycol amine.

One or more secondary amines, hard bases such as sodium hydroxide and potassium hydraxide, or mixtures thereof can be further added to the aqueous polymer composition to adjust the pH value as described above. Examples of suitable secondary amines include N,N-diethylamine, dibutylamine, methylpropyl diamine, or mixtures thereof.

The aqueous polymer composition of the present invention may have a solids content of from 70% to 20%, from 60% to 30%, or from 55% to 40%. The aqueous polymer composition is storage stable, as indicated by a hydrolysis ratio of acetoacetyl functional groups less than 12% after heat aging at 50° C. for 2 weeks. The aqueous polymer composition can dry, or allow to dry, to form a film at room temperature (20-25° C.), or at an elevated temperature, for example, from 35° C. to 60° C. The aqueous polymer composition can provide the film made therefrom with reduced or low yellowness. "Reduced or low yellowness" or "reduced or low yellowing" means that a polymer, a film, or a coating shows Δb of 1 or less after heat aging at 50° C. for two weeks, preferably Δb value being 0.9 or less, 0.8 or less, or even 0.6 or less, as measured by the test method described in the Examples section below.

The present invention also provides a method of reducing yellowing of an aqueous polymer composition, comprising (i) emulsion polymerization of the monomer composition, optionally in the presence of ammonia, a primary amine, or mixtures thereof, to give the emulsion polymer above;

(ii) optionally adding ammonia, a primary amine, or mixtures thereof to the emulsion polymer; thus to form the aqueous polymer composition having a pH value in the range of 6-10;

wherein the equivalent ratio of total ammonia, primary amines, or mixtures thereof added in (i) and (ii) to the acetoacetyl functional monomer is in the range of from 0.125 to 0.8.

This method can provide the aqueous polymer composition, upon drying (i.e., forming a dry film), showing reduced or low yellowness.

The aqueous polymer composition of the present invention may be useful as a low yellowing binder in a coating composition, thus to reduce yellowing of coatings made therefrom. For example, the coatings may demonstrate Δb value less than 1 after heat aging at 50° C. for 2 weeks, as measured by the test method described in the Examples section. The coatings may be prepared by (i) forming the coating composition; (ii) applying the coating composition to a substrate; and (iii) drying or allowing to dry the coating composition to form the coating. The coating composition can dry, or allow to dry, to form a film (this is, coating) at room temperature (20-25° C.), or at an elevated temperature, for example, from 35° C. to 60° C. The coating composition may further comprise pigments, extenders, wetting agents, thickeners, defoamers, dispersants, or mixtures thereof.

The coating composition of the present invention can be applied to a substrate by incumbent means including brushing, dipping, rolling and spraying. The coating composition can be applied to, and adhered to, various substrates including, for example, wood, metals, plastics, foams, stones, elastomeric substrates, glass, fabrics, concrete, or cementious substrates. The coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The coating composition is particularly suitable for architectural coatings. The coating composition can be used alone, or in combination with other coatings to form multi-layer coatings. For example, a multi-layer coating may comprise the coating composition of the present invention as a primer, a tie coat and, optionally, a topcoat.

Examples

Some embodiments of the invention will now be described in the following Examples, wherein all parts and percentages are by weight unless otherwise specified.

DISPONIL FES 32 anionic surfactant ("FES-32") is available from Cognis.

Acrylamide ("AM"), sodium persulfate ("SPS"), ferrous sulfate (FeSO4), ethylene diamine tetraacetic acid ("EDTA"), t-butylhydroperoxide ("t-BHP"), sodium bisulfite ("SBS"), and mono ethanol amine ("MEA"), sodium styrene sulfonate ("SSS"), and sodium vinyl sulfonate ("SVS") are all available from Shanghai Chemical Reagent Co. Ltd.

Ethyl acrylate ("EA"), methyl methacrylate ("MMA"), and methacrylic acid ("MAA") are all available from Shanghai LangYuan Chemical Co. Ltd.

Hydroxyethyl methacrylate ("HEMA") is available from Shanghai Huayi Company.

Acetoacetoxy ethyl methacrylate ("AAEM") is available from The Dow Chemical Company.

BRUGGOLITE FF6 ("FF6") is a reductant available from Bruggemann Chemical.

The following standard analytical equipment and methods are used in the Examples.

Gel Content Test

A 100 mesh screen was weighed by an analytical balance (4 decimal places required) and recorded the weight as $W_0$. 200 grams (g) of test emulsion was filtered with the 100 mesh screen. Then, the screen was placed in a 150° C. oven for 10 minutes. After that, the screen was weighed by the analytical balance (4 decimal places required) and recorded the weight as $W_1$. The gel content was calculated by the equation below, $$\text{Gel content (ppm)}=(W_1-W_0)/200*1000000.$$

If the gel content is equal to or less than 1000 ppm, the emulsion has acceptable process stability. The lower the gel content, the better the process stability. Otherwise, if the gel content is higher than 1000 ppm, the emulsion has unacceptable process stability.

Films Yellowing Test

A test aqueous polymer composition was let down on vinyl chart with a 100 μm film applicator. The initial yellowness, Initial b* value, was tested by a colorimeter (Micromatch plus model from Sheen Company). Then the chart was placed in an oven at 50° C. The yellowness after two weeks, Final b*, was tested. The difference between Initial b* and Final b* is defined as Δb. The lower Δb value, the less yellowing. Δb value of 1.0 or less indicates low yellowing. Otherwise, Δb value larger than 1.0 indicates unacceptable yellowing.

Hydrolysis Evaluation of Acetoacetyl Functional Groups

Acetone level of an aqueous polymer composition was used to characterize the hydrolysis degree of acetoacetyl functional groups. 2.00 g (±0.02 g) of aqueous polymer composition samples were weighed into 20 mL glass vials. The vials were sealed with aluminum crimp-caps. For each aqueous polymer composition sample, at least two vials of the sample were tested for comparison: one vial was placed in a fridge at 5° C. for two weeks, and then initial acetone level was measured; and another vial was placed in a 50° C. oven for heatage for two weeks, and then the acetone level after heatage ("final acetone level") was measured. Both initial acetone level and final acetone level were measured by Gas Chromatography-Mass Spectrometry (GC-MS). The GC-MS and headspace conditions are shown as follows. Delta acetone level (mole) was calculated as final acetone level minus initial acetone level. Hydrolysis ratio of acetoacetyl functional groups was calculated by delta acetone level (mole) divided by initial AAEM mole dosage in the polymer. The higher hydrolysis ratio indicates the more hydrolysis of acetoacetyl functional groups.

| GC/MS conditions for acetone level test | |
|---|---|
| Instrument | Agilent 6890N Gas Chromatography system |
| Column | DB-5MS column (30 m × 0.25 mm ID × 0.25 μm film) |
| Carrier flow | 1.0 ml/min constant flow, helium carrier gas |
| Oven | 40° C., hold 3 min; 10° C./min ramp to 200° C. (Total run time: 19 min) |
| Injection | Headspace system |
| Inlet | Injector temp = 150° C.; Split ratio: 1:1 |

| Detector | MS Detector: MS Source Temperature: 230° C., MS Quad Temperature: 150° C., Aux-2 Temperature: 280° C., Acquire Mode: Scan, and Mass from 29 to 400 Headspace conditions for acetone level test |
|---|---|
| Instrument Conditions | Agilent G1888 Headspace Sampler Oven: 40° C.; Loop: 60° C.; Transfer Line: 80° C.; Multi Headspace Extraction: Off; Shaking: Off; Vial Equilibration: 60 min; Pressurization: 0.5 min; Fill: 1.0 min; Equilibration: 0.1 min; Inject: 0.5 min; GC Cycle: 30 min |

Example (Ex) 1

First, a monomer mixture was prepared by mixing 377.00 g of deionized (DI) water, 41.95 g of Fes-32 surfactant (31%), 450.42 g of MMA, 80.28 g of AM (40% aqueous solution), and 1072.94 g of EA.

Into a 1 gallon vessel, equipped with a reflux condenser, addition funnels and stirrer, an initial water charge was added with agitation at 130 rpm. The reaction vessel was heated to 91° C. 2.07 g of Fes-32 surfactant (31%) was added into the vessel. Then 59.81 g of the monomer mixture and an initial catalyst solution (8.21 g of SPS in 43.18 g of DI water) were charged to the reaction vessel and held for 10 minutes for seed formation at 82-88° C. The remainder of the monomer mixture was added over a period of 90 minutes with temperature between 85° C. and 87° C. At 50% of monomer mixture feed, 57.93 g of AAEM was added to the monomer mixture. After completing addition of the monomer mixture, the contents in the reaction vessel were cooled to room temperature. As the reaction mixture was cooled down, a mixture of 2.45 g of t-BHP in 39.51 g of DI water, and 1.98 g of FF6 in 41.95 g of DI water were added when the temperature was at 65° C. When the vessel temperature reached 50° C. or lower, 2.25 g of MEA was added (MEA/AAEM equivalent ratio: 0.14) to adjust pH of the resulting aqueous polymer composition.

Ex 2

An aqueous polymer composition of Ex 2 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 450.42 g of MMA, 80.28 g of AM (40%), and 1072.94 g of EA.

After obtaining the polymer, 4.64 g of MEA (MEA/AAEM equivalent ratio: 0.28) was added to adjust pH of the resulting aqueous polymer composition.

Ex 3

An aqueous polymer composition of Ex 3 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 442.38 g of MMA, 8.15 g of MAA, 80.28 g of AM (40%), and 1072.94 g of EA.

After obtaining the polymer, 3.35 g of MEA (MEA/AAEM equivalent ratio: 0.20) was added to adjust pH of the resulting aqueous polymer composition.

Ex 4

An aqueous polymer composition of Ex 4 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 442.38 g of MMA, 8.15 g of MAA, 80.28 g of AM (40% aqueous solution), and 1072.94 g of EA.

After obtaining the polymer, 7.65 g of MEA (MEA/AAEM equivalent ratio: 0.46) was added to adjust pH of the resulting aqueous polymer composition.

Ex 5

An aqueous polymer composition of Ex 5 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 8.88 g of SSS (90.5%), 458.95 g of MMA, 8.15 g of MAA, 20.07 g of AM (40% aqueous solution), and 1072.94 g of EA.

After obtaining the polymer, 5.12 g of MEA (MEA/AAEM equivalent ratio: 0.31) was added to adjust pH of the resulting aqueous polymer composition.

Ex 6

An aqueous polymer composition of Ex 6 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 434.34 g of MMA, 16.30 g of MAA, 80.28 g of AM (40% aqueous solution), and 1072.94 g of EA.

After obtaining the polymer, 4.06 g of MEA (MEA/AAEM equivalent ratio: 0.25) was added to adjust pH of the resulting aqueous polymer composition.

Ex 7

An aqueous polymer composition of Ex 7 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 450.90 g of MMA, 128.58 g of SVS (25% aqueous solution), and 1072.94 g of EA.

After obtaining the polymer, 4.13 g of MEA (MEA/AAEM equivalent ratio: 0.25) was added to adjust pH of the resulting aqueous polymer composition.

Ex 8

First, a monomer mixture was prepared by mixing 377.00 g of DI water, 41.95 g of Fes-32 surfactant (31%), 259.27 g of MMA, 8.15 g of MAA, 80.28 g of AM (40% aqueous solution), and 1072.94 g of EA.

Into a 1 gallon vessel, equipped with a reflux condenser, addition funnels and stirrer, an initial water charge was added with agitation at 130 rpm. The reaction vessel was heated to 91° C. 2.07 g of Fes-32 surfactant (31%) was added into the vessel. Then 59.81 g of the monomer mixture and an initial catalyst solution (8.21 g of SPS in 43.18 g of DI water) were charged to the reaction vessel and held for 10 minutes for seed formation at 82-88° C. The remainder of the monomer mixture was added over a period of 90 minutes with temperature between 85° C. and 87° C. At 50% of monomer mixture feed, 241.07 g of AAEM was added to the monomer mix. After completing addition of the monomer mixture, the contents in the reaction vessel were cooled to room temperature. As the reaction mixture was cooled down, a mixture of 2.45 g of t-BHP in 39.51 g of DI water, and 1.98 g of FF6 in 41.95 g of DI water were added when the temperature was at 65° C. to give an emulsion polymer. When the vessel temperature reached 50° C. or below, 17.21 g of MEA (MEA/AAEM equivalent ratio: 0.25) was added to the emulsion polymer to adjust pH of the resulting aqueous polymer composition.

Ex 9

An aqueous polymer composition of Ex 9 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 442.38 g of MMA, 8.15 g of MAA, 80.28 g of AM (40% aqueous solution), and 1072.94 g of EA.

After obtaining the polymer, 13.21 g of MEA (MEA/AAEM equivalent ratio: 0.80) was added to adjust pH of the resulting aqueous polymer composition.

Ex 10

A monomer mixture was prepared by mixing 377.00 g of DI water, 41.95 g of Fes-32 surfactant (31%), 458.47 g of MMA, 16.30 g of MAA, 20.07 g of AM (40%), and 1072.94 g of EA.

Into a 1 gallon vessel, equipped with a reflux condenser, addition funnels and stirrer, an initial water charge was added with agitation at 130 rpm. The reaction vessel was heated to 91° C. 59.81 g of the monomer mixture and an initial catalyst solution (8.21 g of SPS in 43.18 g of DI water) were charged to the reaction vessel. The reaction mixture was held for 10 minutes for seed formation at 82-88° C. The remainder of the monomer mixture was added over a period of 90 minutes with temperature between 85° C. and 87° C. At 50% of monomer mixture feed, 57.93 g of AAEM was added to the monomer mixture. After completing addition of the monomer mixture, the contents in the reaction vessel were cooled to room temperature. As the reaction mixture was cooled down, a mixture of 2.45 g of t-BHP in 39.51 g of DI water, and 1.98 g of FF6 in 41.95 g of DI water were added when the temperature was at 65° C. When the vessel temperature reached 50° C. or below, 4.13 g of MEA (MEA/AAEM equivalent ratio: 0.25) was added to adjust pH of the resulting aqueous polymer composition.

Ex 11

An aqueous polymer composition of Ex 11 was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 354.28 g of MMA, 32.11 g of SSS (90.5%), 200.69 g of AM (40% aqueous solution), 16.06 g of HEMA, and 1072.94 g of EA.

After obtaining the polymer, 4.13 g of MEA (MEA/AAEM equivalent ratio: 0.25) was added to adjust pH of the resulting aqueous polymer composition.

Comparative (Comp) Ex A

An aqueous polymer composition of Comp Ex A was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 434.34 g of MMA, 16.30 g of MAA, 80.28 g of AM (40% aqueous solution), and 1072.94 g of EA.

After obtaining the polymer, 14.87 g of MEA (MEA/AAEM equivalent ratio: 0.90) was added to adjust pH of the resulting aqueous polymer composition.

Comp Ex B

An aqueous polymer composition of Comp Ex B was prepared according to the same procedure as preparing the aqueous polymer composition in Ex 1, except that the monomer mixture used for preparing the polymer and dosage of MEA used for adjusting pH value are as follows, The monomer mixture was prepared by mixing 377.00 g of DI water, 41.95 g of Fes-32 surfactant (31%), 458.46 g of MMA, 24.45 g of MAA, and 1072.94 g of EA.

After obtaining the polymer, 21.18 g of MEA (MEA/AAEM equivalent ratio: 1.28) was added to adjust pH of the resulting aqueous polymer composition.

Comp Ex C

First, a monomer mixture was prepared by mixing 377.00 g of DI water, 41.95 g of Fes-32 surfactant (31%), 472.95 g of MMA, 9.78 g of MAA and 1072.94 g of EA.

Into a 1 gallon vessel, equipped with a reflux condenser, addition funnels and stirrer, an initial water charge was added with agitation at 130 rpm. The reaction vessel was heated to 91° C. 2.07 g of Fes-32 surfactant (31%) was added into the vessel. Then 59.81 g of the monomer mixture and an initial catalyst solution (8.21 g of SPS in 43.18 g of DI water) were charged to the reaction vessel and held for 10 minutes for seed formation at 82-88° C. The remainder of the monomer mixture was added over a period of 90 minutes with temperature between 85° C. and 87° C. At 50% of monomer mixture feed, 57.93 g of AAEM was added to the monomer mixture. During the addition of the monomer mixture, a high level of gel (>100 g) formed in the reaction vessel, which indicates that it had a poor process stability.

Comp Ex D

First, a monomer mixture was prepared by mixing 377.00 g of DI water, 41.95 g of Fes-32 surfactant (31%), 178.56 g of MMA, 8.15 g of MAA, 80.28 g of AM (40%), and 1072.94 g of EA.

Into a 1 gallon vessel, equipped with a reflux condenser, addition funnels and stirrer, an initial water charge was added with agitation at 130 rpm. The reaction vessel was heated to 91° C. 2.07 g of Fes-32 surfactant (31%) was added into the vessel. Then 59.81 g of the monomer mixture and an initial catalyst solution (8.21 g of SPS in 43.18 g of DI water) were charged to the reaction vessel and held for 10 minutes for seed formation at 82-88° C. The remainder of the monomer mixture was added over a period of 90 minutes with temperature between 85° C. and 87° C. At 50% of monomer mixture feed, 321.83 g of AAEM was added to the monomer mixture. After completing addition of the monomer mixture, the contents in the reaction vessel were cooled to room temperature. As the reaction mixture was cooled down, a mixture of 2.45 g of t-BHP in 39.51 g of DI water, and 1.98 g of FF6 in 41.95 g of DI water were added when the temperature was at 65° C. to give an emulsion polymer. When the vessel temperature reached 50° C. or below, 22.94 g of MEA (MEA/AAEM equivalent ratio: 0.25) was added to adjust pH of the resulting aqueous polymer composition.

Comp Ex E

An aqueous polymer composition of Comp Ex E was prepared according to the same procedure as preparing the aqueous polymer composition in Ex 1, except that no MEA was used and the monomer mixture used for preparing the polymer are shown as follows, The monomer mixture was prepared by mixing 377.00 g of DI water, 41.95 g of Fes-32 surfactant (31%), 463.30 g of MMA, 16.30 g of MAA, 8.028 g of AM (40%), and 1072.94 g of EA.

The obtained polymer emulsion has a particle size of 158 nm and a high gel content (>10 g), which indicates that it had unacceptable process stability.

Properties of the aqueous polymer compositions of Exs 1-11 and Comp Exs A-E are given in Table 1.

TABLE 1

Composition and Properties of Aqueous Polymer Composition

| | Composition of emulsion polymer* | Neutralizer | MEA/AAEM equivalent ratio | Particle size, nm | pH | Gel content |
|---|---|---|---|---|---|---|
| Ex 1 | 66.4EA/28MMA/3.6AAEM/2AM | MEA | 0.14 | 157 | 7.99 | <50 ppm |
| Ex 2 | 66.4EA/28MMA/3.6AAEM/2AM | MEA | 0.28 | 157 | 9.25 | <50 ppm |
| Ex 3 | 66.4EA/27.5MMA/3.6AAEM/0.5MAA/2AM | MEA | 0.20 | 158 | 7.92 | <50 ppm |
| Ex 4 | 66.4EA/27.5MMA/3.6AAEM/0.5MAA/2AM | MEA | 0.46 | 158 | 9.13 | <50 ppm |
| Ex 5 | 66.4EA/28.5MMA/3.6AAEM/0.5MAA/0.5AM/0.5SSS | MEA | 0.31 | 152 | 8.23 | <50 ppm |
| Ex 6 | 66.4EA/27MMA/3.6AAEM/1MAA/2AM | MEA | 0.25 | 155 | 7.78 | <50 ppm |
| Ex 7 | 66.4EA/28MMA/3.6AAEM/2SVS | MEA | 0.25 | 160 | 8.76 | 121 ppm |
| Ex 8 | 66.4EA/16.1MMA/15AAEM/0.5MAA/2AM | MEA | 0.25 | 162 | 8.22 | <50 ppm |
| Ex 9 | 66.4EA/27.5MMA/3.6AAEM/0.5MAA/2AM | MEA | 0.80 | 158 | 9.66 | <50 ppm |
| Ex 10 | 66.4EA/28.5MMA/3.6AAEM/1MAA/0.5AM | MEA | 0.25 | 248 | 7.81 | 288 ppm |
| Ex 11 | 66.4EA/22MMA/3.6AAEM/5AM/2SSS/1HEMA | MEA | 0.25 | 155 | 9.06 | <50 ppm |
| Comp Ex A | 66.4EA/27MMA/3.6AAEM/1MAA/2AM | MEA | 0.90 | 155 | 9.81 | <50 ppm |
| Comp Ex B | 66.4EA/27MMA/3.6AAEM/1.5MAA | MEA | 1.28 | 151 | 8.60 | <50 ppm |
| Comp Ex C | 66.4EA/29.4MMA/3.6AAEM/0.6MAA | N/A | N/A | 156 | N/A | >100 g |
| Comp Ex D | 66.4EA/11.1MMA/20AAEM/0.5MAA/2AM | MEA | 0.25 | 163 | 7.88 | <50 ppm |
| Comp Ex E | 66.4EA/28.8MMA/3.6AAEM/1MAA/0.2AM | N/A | N/A | 158 | N/A | >10 g |

*% by weight based on the total weight of monomers

The aqueous polymer compositions of Exs 1-11 all demonstrated acceptable process stability. In addition, the aqueous polymer compositions of Exs 1-9 and 11 showed better process stability than that of Ex 10. In contrast, the aqueous polymer compositions of Comp Exs C and E showed unacceptable process stability.

The aqueous polymer compositions with acceptable process stability were further evaluated for hydrolysis and yellowing properties according to the test methods described above and results are given in Tables 3 and 4. As shown in Table 3, the aqueous polymer compositions of Exs 1-11 are storage stable, as indicated by hydrolysis ratios less than 12% after heat aging at 50° C. for 2 weeks. Moreover, films obtained from the aqueous polymer compositions of Exs 1-11 showed low yellowing (Δb value less than 1 after 2 weeks at 50° C.). In contrast, as shown in Table 4, dry films obtained from the aqueous polymer composition of Comp Ex A (MEA/AAEM equivalent ratio: 0.90) showed undesirably high level of yellowness. The aqueous polymer composition of Comp Ex B comprising a high level of MAA (1.5% MAA level) and high MEA/AAEM ratio resulted in undesirably high yellowing of the obtained films. The aqueous polymer composition of Comp Ex D comprising a high level of polymerized units of AAEM (20%) demonstrated an undesirably high hydrolysis ratio of acetoacetyl functional groups and resulted in films made therefrom with undesirably high yellowness.

TABLE 3

|  | Ex 1 | Ex 2 | Ex 3 | Ex 4 | Ex 5 | Ex 6 | Ex 7 | Ex 8 | Ex 9 | Ex 10 | Ex 11 |
|---|---|---|---|---|---|---|---|---|---|---|---|
| Δb* | 0.59 | 0.68 | 0.66 | 0.85 | 0.82 | 0.68 | 0.4 | 0.66 | 0.92 | 0.67 | 0.62 |
| Hydrolysis ratio** | 9.69% | 8.48% | 8.06% | 7.75% | 8.77% | 10.15% | 8.19% | 10.73% | 8.31% | 9.15% | 9.61% |

*Δb after two week heatage at 50° C.;
**Hydrolysis ratio of acetoacetyl functional groups.

TABLE 4

|  | Comp Ex A | Comp Ex B | Comp Ex D |
|---|---|---|---|
| Δb after two week heatage at 50° C. | 1.03 | 1.04 | 1.75 |
| Hydrolysis ratio of acetoacetyl functional groups | 7.69% | 9.86% | 12.82% |

What is claimed is:

1. A method of making an aqueous polymer composition, comprising,
   (i) emulsion polymerization of a monomer composition, optionally in the presence of ammonia, a primary amine, or mixtures thereof, to give an emulsion polymer; wherein the monomer composition comprises, based on the total weight of the monomer composition,
      (a) from 1% to 15% by weight of an acetoacetyl functional monomer;
      (b) from 0.3% to 10% by weight of an ethylenically unsaturated monomer carrying at least one functional group selected from a sulfonate, hydroxyl, amide, or ureido group; and
      (c) from 0 to 1% by weight of an ethylenically unsaturated acid monomer selected from an α,β-unsaturated carboxylic acid, a phosphorous-containing acid monomer, and mixtures thereof;
   provided that the total amount of (b) and (c) is at least 1.3% by weight; and
   (ii) adding ammonia, a primary amine, or mixtures thereof to the emulsion polymer; thus to form the aqueous polymer composition having a pH value in the range of 6-10;
   wherein the equivalent ratio of total ammonia, primary amines, or mixtures thereof added in (i) and (ii) to the acetoacetyl functional monomer is in the range of from 0.125 to 0.8.

2. The method of claim 1, wherein the weight ratio of the ethylenically unsaturated monomer carrying at least one functional group to the ethylenically unsaturated acid monomer is more than 0.5.

3. The method of claim 1 wherein the ethylenically unsaturated monomer carrying at least one functional group is selected from the group consisting of acrylamide, methacrylamide, sodium styrene sulfonate, sodium vinyl sulfonate, ureido-functional alkyl (meth)acrylate, and hydroxyl-functional alkyl (meth)acrylate.

4. The method of claim 1 wherein the primary amine is monoethanol amine.

5. The method of claim 1, wherein the equivalent ratio of total ammonia, primary amines, or mixtures thereof to the acetoacetyl functional monomer is in the range of from 0.2 to 0.6.

6. The method of claim 1, wherein the monomer composition comprises, based on the total weight of the monomer composition, less than 0.3% by weight of the ethylenically unsaturated acid monomer.

7. The method of claim 1, wherein the acetoacetyl functional monomer is selected from the group consisting of acetoacetoxyethyl methacrylate, acetoacetoxyethyl acrylate, acetoacetoxypropyl methacrylate, allyl acetoacetate, acetoacetoxybutyl methacrylate, and 2,3-di(acetoacetoxy) propyl methacrylate.

8. The method of claim 1, wherein the monomer composition further comprises an alkyl ester of (meth)acrylic acid, a vinyl aromatic monomer, or mixtures thereof.

9. The method of claim 1, wherein the monomer composition comprises, based on the total weight of the monomer composition, from 0.8% to 5% by weight of the ethylenically unsaturated monomers carrying at least one functional group and from 0 to 0.5% by weight of the ethylenically unsaturated acid monomer.

10. An aqueous polymer composition obtained by the method of claim 1.

11. A coating composition comprising the aqueous polymer composition of claim 10.

* * * * *